US012131530B2

(12) United States Patent
Ehrlich et al.

(10) Patent No.: US 12,131,530 B2
(45) Date of Patent: Oct. 29, 2024

(54) REAL-TIME GEOSPATIAL TRACKING

(71) Applicant: Overwatch Systems, Ltd., Sterling, VA (US)

(72) Inventors: Jonathan Michael Ehrlich, Yorktown, VA (US); Hillel Steinberg, Rockville, MD (US)

(73) Assignee: Overwatch Systems, Ltd., Sterling, VA (US)

( * ) Notice: Subject to any disclaimer, the term of this patent is extended or adjusted under 35 U.S.C. 154(b) by 159 days.

(21) Appl. No.: 17/372,062

(22) Filed: Jul. 9, 2021

(65) Prior Publication Data

US 2022/0012461 A1 Jan. 13, 2022

Related U.S. Application Data

(60) Provisional application No. 63/050,666, filed on Jul. 10, 2020.

(51) Int. Cl.
*G06V 10/20* (2022.01)
*G06F 18/214* (2023.01)
*G06V 20/13* (2022.01)
*G06V 20/40* (2022.01)

(52) U.S. Cl.
CPC .......... *G06V 20/13* (2022.01); *G06F 18/2155* (2023.01); *G06V 10/255* (2022.01); *G06V 20/41* (2022.01)

(58) Field of Classification Search
None
See application file for complete search history.

(56) References Cited

U.S. PATENT DOCUMENTS

| | | | |
|---|---|---|---|
| 9,076,259 B2 * | 7/2015 | Hourie | G06T 17/05 |
| 10,353,389 B2 | 7/2019 | Abernathy | |
| 11,240,634 B1 * | 2/2022 | Cain, II | H04W 4/029 |
| 2011/0007134 A1 * | 1/2011 | Knize | G06F 16/29 |
| | | | 348/43 |
| 2011/0007962 A1 * | 1/2011 | Johnson | G06F 16/9537 |
| | | | 382/154 |

(Continued)

FOREIGN PATENT DOCUMENTS

WO 2020170237 8/2020

OTHER PUBLICATIONS

Drobish Hart et al: "Application of Real-time Tactical Intelligence on Wild Land Fire", TFRSAC Conference, May 30, 2019 (May 30, 2019), XP055853104, Retrieved from the Internet: URL:https://appliedsciences.nasa.gov/sites/default/files/2019-09/drobish.pdf [retrieved on Oct. 20, 2021] slides: 6, 8, 10, 11, 12.

(Continued)

*Primary Examiner* — Idowu O Osifade
(74) *Attorney, Agent, or Firm* — BainwoodHuang (57) ABSTRACT

A technique for geospatial tracking includes receiving live video from a first source, rendering a map that encompasses a geographical region imaged by the live video, and displaying the map along with the live video, thereby enabling a human user or computer to associate objects in the video with geographical features on the map. The technique further includes receiving geotagged content from a second source and displaying a representation of the geotagged content along with the video and the map.

19 Claims, 6 Drawing Sheets

(56) References Cited

U.S. PATENT DOCUMENTS

| | | | |
|---|---|---|---|
| 2013/0013414 A1* | 1/2013 | Haff | G06Q 30/0241 |
| | | | 705/14.64 |
| 2014/0006129 A1* | 1/2014 | Heath | G06Q 30/02 |
| | | | 705/14.23 |
| 2014/0133824 A1* | 5/2014 | Yoel | G06F 16/29 |
| | | | 386/201 |
| 2017/0228878 A1 | 8/2017 | Goldman et al. | |
| 2019/0258720 A1* | 8/2019 | Case | G06F 16/487 |
| 2019/0342249 A1* | 11/2019 | Holmes | H04L 67/104 |
| 2020/0111267 A1* | 4/2020 | Stauber | G06F 3/017 |
| 2020/0142388 A1* | 5/2020 | Maggiore | H04W 4/33 |
| 2020/0380056 A1 | 12/2020 | Morris et al. | |

OTHER PUBLICATIONS

Anonymous: "ERS—Enhanced Reality System", Feb. 18, 2019 (Feb. 18, 2019), XP055853218, Retrieved from the Internet: URL:https://web.archive.org/web/20190218050601/http://www.euroavionics.com/?q=node/523 [retrieved on Oct. 20, 2021] the whole document.

PCT/US2021/041114, Communication Relating to the Results of the Partial International Search dated Nov. 4, 2021, 36 pages.

Szwoch Grzegors et al: "Detection of Vehicles Stopping in Restricted Zones in Video from Surveillance Cameras" In: "Methods and Applications for Modeling and Simulation Conference, AsiaSim 2018, Kyoto, Japan, Oct. 27-29, 2018, Proceedings", Jan. 1, 2014 (Jan. 1, 2014), Springer Singapore, Singapore, XP055886377, ISSN: 1865-0929 ISBN 978-981-1328-53-4 vol. 429, pp. 242-253, DOI: 10.1007/978-3-319-07569-3_20, Retrieved from the Internet: URL:http://dx.doi.org/10.1007/978-3-319-07569-3_20>abstract section 1.

Saak Kavasidis et al: "An innovative web-based collaborative platform for video annotation", Multimedia Tools and Applications., vol. 70, No. 1, Mar. 26, 2013 (Mar. 26, 2013), pp. 413-432, XP055603476, US ISSN: 1380-7501, DOI: 10.1007/s11042-013-1419-7 abstract.

PCT/US2021/041114, Notification of Transmittal of the International Search Report and the Written Opinion of the International Searching Authority, or the Declaration date Feb. 23, 2022, 18 pages.

* cited by examiner

REAL-TIME GEOSPATIAL TRACKING

CROSS-REFERENCE TO RELATED APPLICATIONS

This application claims the benefit of United States Provisional Patent Application No. 63/050,666, filed Jul. 10, 2020, the contents and teachings of which are incorporated herein by reference in their entirety.

BACKGROUND

Rescue, surveillance, policing, military, and homeland security operations place high demands on situational awareness, collaboration, and the ability to integrate information from a variety of sources.

Some organizations use mapping software, such as customized versions of commercial mapping services, to track locations of assets and personnel. For example, customized versions of Google Earth allow users to place objects onto a map, update the map as the objects move, and visualize geographical relationships.

SUMMARY

Unfortunately, the above-described approach is limited in its usefulness and capabilities. For example, the above approach generally finds applications in specific organizations (e.g., police departments, fire departments, etc.), or in tracking objects of a particular kind (e.g., police cars, fire trucks, etc.). Thus, the prior approach may provide no way of visualizing assets and personnel across disparate domains. It may also provide few if any ways of achieving effective collaboration among personnel monitoring such domains. These limitations negatively impact cooperation and fail to facilitate insights which may be drawn from more expansive views. A more broadly applicable and collaborative approach is therefore needed.

To address this need at least in part, an improved technique for geospatial tracking includes receiving live video from a first source, rendering a map that encompasses a geographical region imaged by the live video, and displaying the map along with the live video, thereby enabling a human user or computer to associate objects in the video with geographical features on the map. The technique further includes receiving geotagged content from a second source and displaying a representation of the geotagged content along with the video and the map. Geotagged content from any number of sources may be obtained and displayed, enabling personnel to observe maps, video, and representations of geotagged content across multiple domains in a common view, which facilitates insights and cooperation that would be difficult or impossible to achieve otherwise.

Certain embodiments are directed to a method of performing collaborative geospatial tracking. The method includes receiving, by a computing device, (i) live video from a first source and (ii) geotagged content from a second source. The method further includes providing a map that encompasses a geographical region imaged by the live video, and simultaneously displaying, by the computing device, the map, the live video, and a representation of the geotagged content from the second source.

In some examples, displaying the representation of the geotagged content includes rendering a symbol that represents the geotagged content and placing the symbol on the map at a location based on geographical coordinates of the geotagged content.

In some examples, the method further includes receiving additional geotagged content from a third source, and displaying the additional geotagged content source as a second symbol on the map, the second symbol having a different appearance than the symbol. According to some examples, the second source and the third source are disposed at respective different locations.

In some examples, simultaneously displaying includes rendering the map in a first display region of the computing device and rendering the live video in a second display region of the computing device.

In some examples, simultaneously displaying further includes projecting a modified version of the live video onto a portion of the map, the first display region thereby displaying both dynamic content of the live video and static content of the map.

In some examples, simultaneously displaying includes projecting a modified version of the live video onto the map, such that the computing device displays dynamic content of the live video overlaying static content of the map.

In some examples, the modified version of the live video is generated at least in part by: removing a perspective effect in the live video, including aligning vertices of the live video with corresponding geographical points on the map; and transforming the live video to fit within the geographical points on the map.

In some examples, the method further includes, in response to a user or machine action that selects an object shown in the live video, (i) drawing an indication that identifies the selected object; and (ii) tracking the selected object on successive frames of the live video such that the indication continues to follow the selected object as the selected object moves.

In some examples, the method further includes receiving input that specifies a geographical area on the map and generating an alert in response to the selected object entering the specified geographical area.

In some examples, the method further includes receiving a label that identifies the selected object and displaying the label adjacent to the selected object, such that the label follows the selected object as the selected object moves.

In some examples, the method further includes receiving notes pertaining to the selected object and storing the notes in association with the selected object.

In some examples, the method further includes recording user-interface activity that occurs while the selected object is being displayed and storing a record of the user-interface activity in connection with the selected object.

In some examples, the user-interface activity includes at least one of (i) clicks on the selected object; (ii) notes entered in connection with the selected object, or (iii) snapshots taken of the map and/or live video when the selected object is being displayed.

In some examples, the method further includes generating a tracking report for the selected object, the tracking report including the record of the user-interface activity in connection with the selected object.

In some examples, the method further includes the computing device running a first instance of a software application, and sharing, by the first instance of the software application, the record of the user-interface activity in connection with the selected object with a second instance of the software application, thereby enabling the second instance of the software application to track the selected object.

In some examples, the method further includes the computing device running a first instance of a software application, receiving a second record of user-interface activity obtained by a second instance of the software application, the second record of user-interface activity pertaining to a second selected object being tracked by the second instance of the software application, and displaying a representation of the second selected object on the map by the first instance of the software application.

In some examples, the method further includes storing a record of user-interface activity accumulated while tracking the selected object during a first interval of time, ceasing to track the selected object, responsive to the selected object not being displayed in the live video during a second interval of time after the first interval of time, and during a third interval of time after the second interval of time, (i) identifying an object appearing in the live video as the selected object and (ii) associating the record of user-interface activity accumulated during the first interval of time with the identified object.

In some examples, receiving the video includes receiving live, full-motion video from an airborne vehicle in flight.

In some examples, the technique further includes, when receiving the video, also receiving metadata that specifies or implies geospatial coordinates of the geographical region imaged by the video, and wherein rendering the map includes searching a map data source based on the geospatial coordinates specified or implied by the metadata.

In some examples, displaying the map along with the video includes displaying the map in a first window of a display device and displaying the video in a second window of the display device.

In some examples, the technique further includes displaying the metadata in a window of the display device.

In some examples, the metadata includes at least one of position, altitude, pitch, and speed of the airborne vehicle as reported by the airborne vehicle.

According to some examples, rendering the map includes updating the map in response to changes in the geographical region imaged by the video.

In some examples, rendering the map includes rendering at least one region adjacent to the geographical region imaged by the video, such that the map is not limited in its extent to the geographical region.

According to some examples, rendering the map includes visually highlighting areas on the map that correspond to the geographical region imaged by the video. According to some variants, the video has a perimeter, and visually highlighting the areas on the map includes transforming the perimeter of the video to a corresponding perimeter on the map. In some variants, transforming the perimeter of the video includes rendering the perimeter on the map with a shape that corrects for a perspective of the video.

In some examples, rendering the map includes displaying a set of inference lines that extend toward a determined location of the video source, e.g., the airborne vehicle.

According to some examples, the technique further includes providing a set of user-interface (UI) controls that enable the human user or computer to tag objects displayed in the first window and/or the second window. According to some variants, a UI control is operable to associate an object displayed in the first window with an object displayed in the second window.

In some examples, the technique responds to selection of an object in the video by automatically drawing a shape, such as a closely-surrounding rectangle, around the selected object and accepting entry of a label, which the technique displays adjacent to the shape.

In some examples, the technique includes updating a location of the shape applied to the selected object as the selected object moves within the second window over successive video frames.

According to some examples, the selected object appears at a first location in the video at a first instant in time and later appears at a second location in the video at a second instant of time. The technique automatically associates the selected object at the second location with the same selected object as it appeared at the first location. According to some variants, the technique includes rendering a visual indication of a path followed by the selected object as the selected object moves over time.

According to some examples, an object appears at a first location in the video at a first instant in time and later appears at a second location in the video at a second instant of time. The object disappears from view in the video between the first instant of time and the second instant of time, and the technique includes a UI control to associate the object at the second location with the same object as it previously appeared at the first location. In some examples, the object is associated with a set of user-entered annotations, and operating the UI control associates the set of user-entered annotations with the object at the second location.

In some examples, the UI controls include a control to identify a target object in the video, to draw a shape on the map, and to trigger an alert in response to the target object entering the shape drawn on the map.

In some examples, the UI controls include an annotation control for creating entries in an event log. According to some examples, the UI controls further include a control for creating a report based on the event log in a standard document format, such as a word-processing format, spreadsheet format, or presentation format. According to some variants, the UI controls include controls for taking snapshots of the video, for annotating snapshots, and/or for saving snapshots in connection with respective timestamps, allowing inclusion of the snapshots in reports along with annotations.

In some examples, the technique includes interfaces for receiving video from multiple sources, such as multiple airborne vehicles. In such examples, the technique may further include displaying videos from the video sources in respective windows and rendering the map view to include geographical regions imaged by the videos from the multiple sources.

In some examples, the UI controls include a set of controls for communicating with a controller of the airborne vehicle.

In some examples, the technique includes receiving geotagged data from external sources, such as cell phones, security cameras, fire stations, and the like, and integrating the diverse information, based on the geotagged data, as displayed features in the map and/or the video.

In some examples, the improved technique is embodied in a software application that runs on a computer. According to some variants, the software application is a desktop application that directs at least a portion of its processing to a GPU (Graphics Processing Unit) of the computer.

In some examples, the software application includes an interface to third-party mapping software, such as Google Maps or Google Earth, for example.

In some examples, video from respective video sources is obtained by respective instances of the software application, the respective instances sharing information over a computer network.

In some examples, multiple instances of the software application receive the same video, with different instances tracking respective objects in the video and communicating information about those objects to other instances in a collaborative manner.

In some examples, multiple instances of the software application ingest video feeds from multiple video sources that acquire video of a same area, with different instances tracking respective objects in the area and communicating information about those objects to other instances in a collaborative manner.

In some examples, the improved technique is embodied in a software plugin that that communicates with a cloud-based software platform.

Certain embodiments are directed to methods for performing acts of the above-described technique, including any examples and/or variants thereof. Other embodiments are directed to a computing device constructed and arranged to perform any of the methods described above. Still other embodiments are directed to a computer program product. The computer program product stores instructions which, when executed on control circuitry of a computing device, cause the computing device to perform any of the methods described above.

The foregoing summary is presented for illustrative purposes to assist the reader in grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for responding to demands of complex operations includes receiving live video from a first source, rendering a map that encompasses a geographical region imaged by the live video, and displaying the map along with the live video, thereby enabling a human user or computer to associate objects in the video with geographical features on the map. The technique further includes receiving geotagged content from a second source and displaying a representation of the geotagged content along with the video and the map. Geotagged content from any number of sources may be obtained and displayed, enabling personnel to observe maps, video, and representations of geotagged content across multiple domains in a common view, which facilitates insights and cooperation that would be difficult if not impossible to achieve otherwise.

Figure 1:
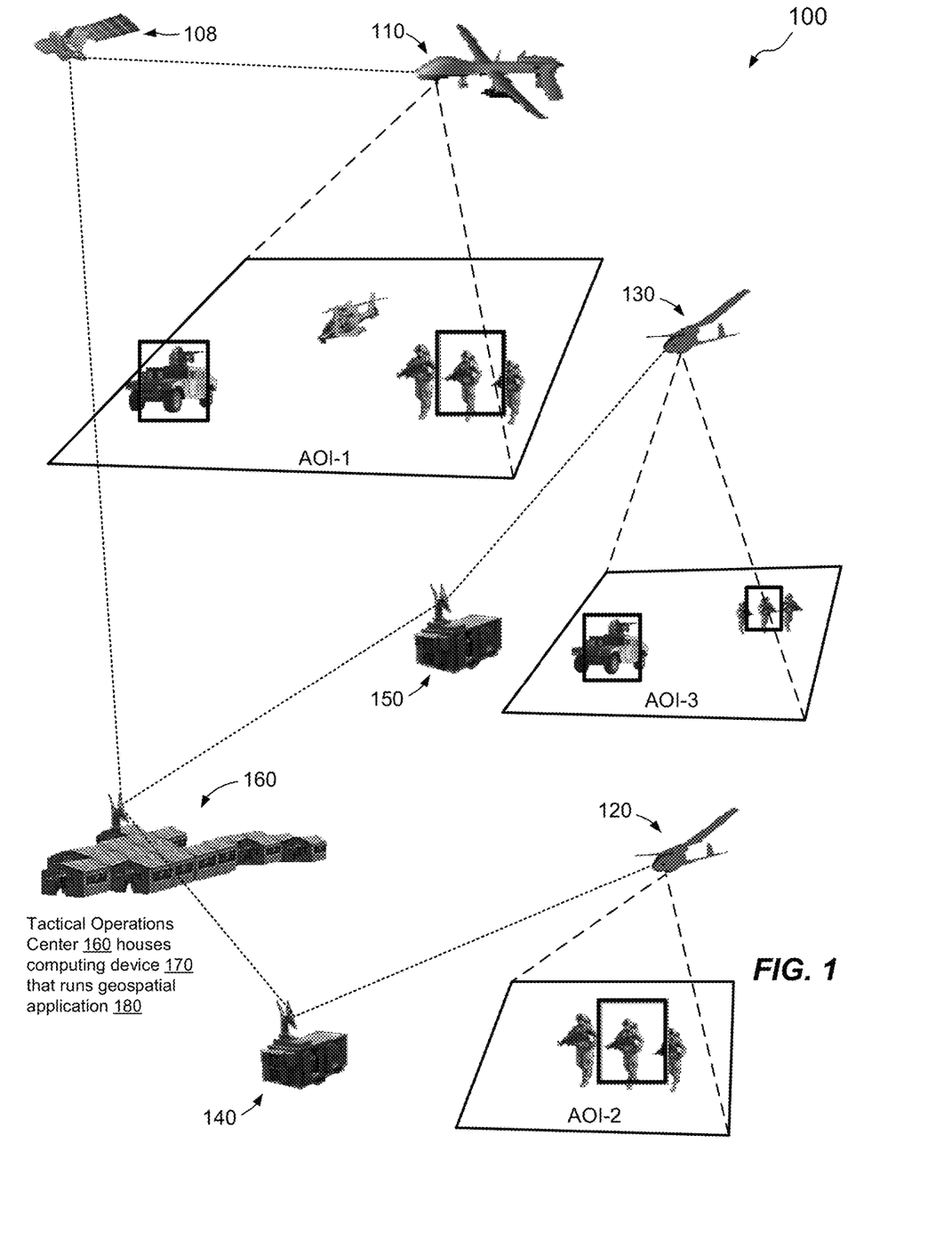
FIG. 1 is a block diagram of an example environment in which embodiments of the improved technique can be practiced.

FIG. 1 shows an example environment 100 in which embodiments of the improved technique can be practiced. Here, it is assumed that a situation warranting attention is unfolding on the ground. Various airborne vehicles 110, 120, and 130 observe the situation and direct respective video cameras to respective AOIs (areas of interest). For example, vehicle 110 obtains live video of AOI-1, vehicle 120 obtains live video of AOI-2, and vehicle 130 obtains live video of AOI-3.

The AOIs may contain persons and/or equipment that may be relevant to situational monitoring, such as police or firefighting assets, suspected wrongdoers, and the like. However, any area containing persons, equipment or other features deemed relevant may be considered an AOI.

As they acquire live video, the airborne vehicles 110, 120, and 130 may transmit the video to a technical operations center (TOC) 160. Transmitting video may involve satellite communications (e.g., via satellite 108) and/or RF/Microwave communications using ground control stations, shown by way of example as stations 140 and 150.

In the example shown, which is intended to be illustrative rather than limiting, TOC 160 houses a computing device 170 that runs a geospatial software application 180. The application 180 is configured to receive one or more of the video feeds, e.g., from airborne vehicles 110, 120, and 130, and to selectively display one or more of the video feeds along with associated map information, as well as geotagged contents based on other received information.

In some examples, the environment 100 includes multiple computing devices configured to run respective instances of the geospatial software application 180, which may be deployed at various locations. For example, a first instance of the geospatial software application 180 may be deployed at TOC 160 (as described above) and second and third instances of the geospatial software application 180 may be deployed at ground control stations 140 and 150, respectively. Each instance of the geospatial software application 180 may be run on a respective computing device and may be operated by a respective user. The computing devices may be networked together in any suitable way, e.g., using point-to-point RF/microwave connections, satellite connections, cables, custom communication protocols, or standard protocols, such as TCP/IP. In some examples, a single computing device is configured with multiple instances of the geospatial software application 180, which may be configured to display their respective output on respective monitors. Many possible arrangements are contemplated.

Although the environment 100 is seen to provide cameras on airborne vehicles 110, 120, and 130 to facilitate capture of live video, embodiments are not limited to video from airborne sources. Rather, live video may alternatively be provided from ground-based vehicles, seafaring vehicles, or by individual persons, such as by people obtaining live video using their cell phones, for example. Also, different feeds of live video may arrive from different sources.

The geospatial software application 180 integrates video, maps, and geotagged content from any number of sources to provide operators with unique capabilities for tracking objects of interest and for sharing information. The application 180 thus provides operators with contextual information, greatly enhancing their situational awareness and helping them to respond effectively to emerging situations in real time.

Figure 2:
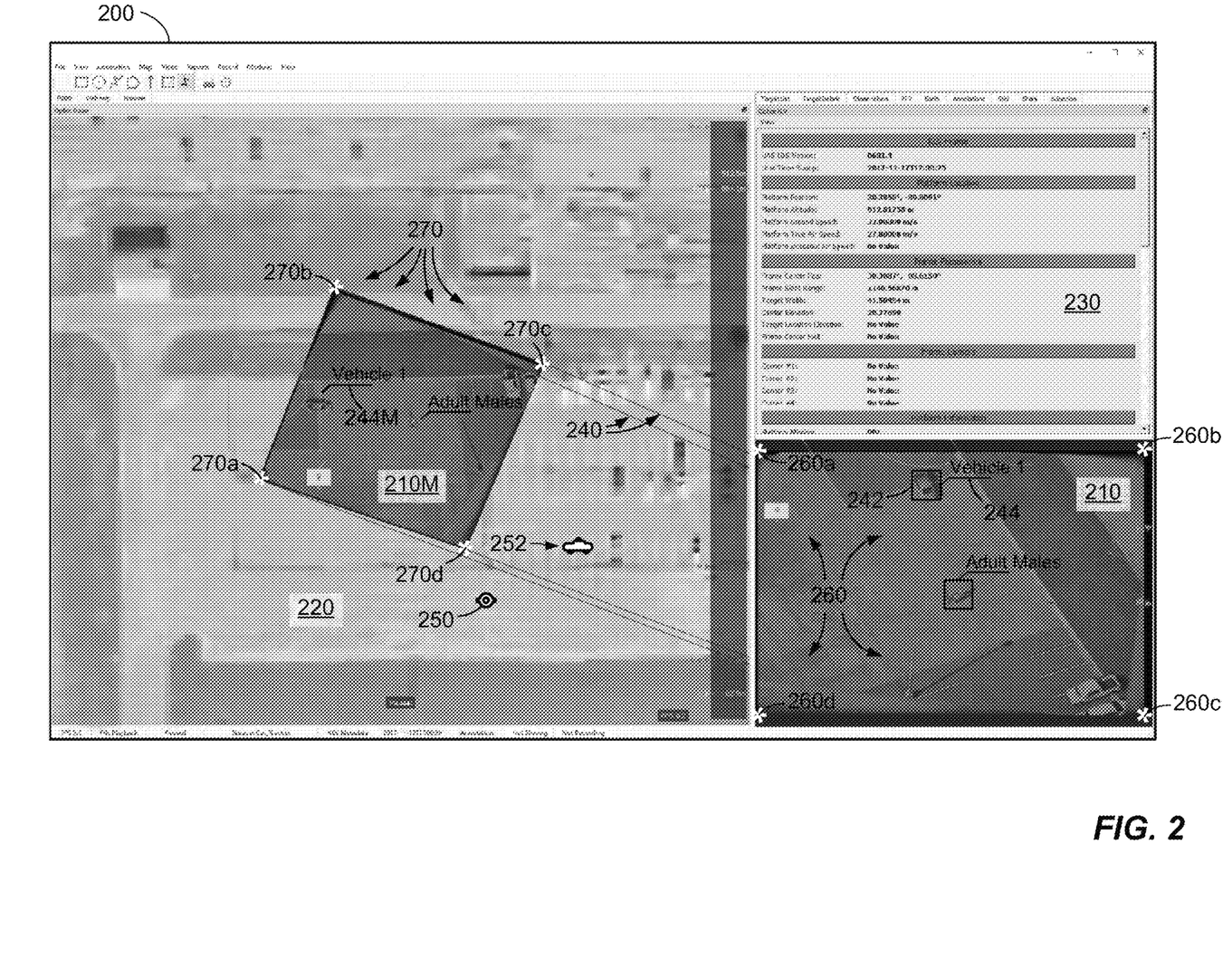
FIG. 2 is an example screenshot of a geospatial application that runs on a computing device of FIG. 1.

FIG. 2 shows an example screenshot of the geospatial software application 180 in accordance with certain embodiments. For example, the geospatial software application 180 is configured to run on the computing device 170 (FIG. 1) and to generate graphical output, such as may be provided in the form of a window 200. In some cases, output is provided in multiple windows. A human operator or user (not shown) may run the geospatial software application 180 and interact with a GUI (graphical user interface) to access the many features of the application 180, e.g., using a keyboard, mouse, and/or other input device. In an example, the geospatial software application 180 is a desktop application configured to run on a standard computer (e.g., a PC or Mac) using a standard operating system (e.g., Windows, macOS, or Linux). Versions of the geospatial software application 180 may also be provided for operation on mobile devices, such as tablets, smart phones, and PDAs (personal data assistants).

As shown, the window 200 includes three main display regions, a first region 210 that displays video, a second region 220 that displays a map, and a third region 230 that displays metadata. The content and layout of window 200 may be varied. For example, any of the regions 210, 220, and/or 230 may be hidden or disabled. In some examples, multiple video regions (like 210) may be provided for displaying multiple video streams from multiple respective sources.

In an example, the first region 210 displays unaltered video from a source, such as a camera mounted to an airborne vehicle. The orientation of the video preferably reflects the orientation of the camera, e.g., with no effort made to correct for angle or perspective. Nevertheless, the geospatial software application 180 may provide image-enhancement controls to adjust brightness, contrast, color, and the like. In the example shown, the camera is trained at an area on the ground. The vehicle may be a considerable distance away from that area (e.g., several kilometers away), such that the video shown in region 210 may reflect a narrow field of view. The camera operates at a frame rate, and the region 210 preferably updates the displayed content upon receipt of each frame.

The second region 220 is configured to display a map. The map may be updated from time to time but is typically static in the short term. Suitable sources for the map include Google Maps, Google Earth, and Maxar Technologies of Westminster, Col., for example.

The third region 230 provides metadata that pertains to the video being displayed in the first region 210. For example, the metadata may contain information received from an airborne vehicle that captures the video, such as its latitude, longitude, altitude, ground speed, bearing, fuel level, and the like. The metadata may further include information about the camera (also referred to herein as a "sensor"), such as its pointing direction, exposure settings, and the like. In some examples, metadata displayed in region 230 is received with successive video frames from the camera, and/or is provided in out-of-band transmissions. Some metadata may be provided on a per-frame basis. The geospatial software application 180 receives such metadata and uses the metadata to populate fields displayed in region 230. Typically, different types of vehicles provide different types of metadata, and the geospatial software application 180 responds appropriately by providing fields that are relevant to the vehicle that provides the video.

In an example, the metadata in region 230 provides sufficient information to geographically locate the FOV (field of view) displayed in region 210. For example, the geospatial software application 180 uses geolocation (including altitude) of the vehicle and the altitude and azimuth of the camera to estimate a current location on the map of the video being acquired by the camera. Once this location is determined, the geospatial software application 180 may project the video shown in the first region 210 onto the map shown in region 220. An example of this projected video is shown in region 210M, which is disposed within region 220. Inference lines 240 (four shown) point toward the location of the camera.

As the view from the camera is distant and angled compared with the orthogonal perspective of the map, projecting the video onto the map may involve transforming the video such that its orientation and perspective conform with that of the map. In one example, which is intended merely for illustration, the geospatial software application 180 transforms the video in region 210 by identifying vertices 260 in the video (e.g., 260a, 260b, 260c, and 260d; shown as white stars), calculating their corresponding geo-locations from the metadata, and identifying corresponding points 270 on the map, such as points 270a, 270b, 270c, and 270d). Points 260 form a first quadrilateral, and points 270 form a second quadrilateral. The geospatial software application 180 may proceed by transforming pixels within the first quadrilateral to corresponding pixels in the second quadrilateral. This operation has the effect of deskewing the video and presenting it orthogonally. One should appreciate that similar effects can be achieved with different approaches, however. For example, different numbers of vertices may be used. Also, the vertices 160 need not be the extreme corners of the video but rather may define a sub-area of the video. Preferably, the geospatial software application 180 performs the above-described transformation on a per-frame basis, such that the region 210M containing the projected video tracks the live the video in region 210 frame for frame.

As further shown in FIG. 2, the map in region 220 displays various symbols, such as symbols 250 and 252. In an example, symbols 250 and 252 are representations of geotagged content received from various sources. For example, symbol 250 may depict a standard symbol for a fire hydrant, which has been identified and geolocated in a data feed received from a local fire department. Likewise, symbol 252 may depict a standard symbol for a police car, which has been identified and geolocated in a data feed received from a local police station. In an example, the geospatial software application 180 receives the data feeds on a subscriber basis, such that any time the fire department or police station updates is information on fire hydrants or police cars, the geospatial software application 180, which subscribes to these updates, receives the updated information and displays the symbols 250 and 252 on the map accordingly.

One should appreciate that the geospatial software application 180 may receive geotagged content from any number of sources, and that such sources may include other instances of the geospatial software application 180. For example, the geospatial software application 180 may subscribe to objects of interest identified by a second instance of the geospatial software application 180 and may display those objects as symbols in the local instance. Likewise, the local instance of the geospatial software application 180 may publish objects of interest being tracked locally. Other instances may subscribe to those published objects. By incorporating information from diverse sources, the local geospatial software application 180 greatly enhances contextual information, which promotes increased situational awareness on the part of operators.

As still further shown in FIG. 2, users of the geospatial software application 180 have the ability to select, label, and track objects displayed in the video. For example, a user may click on a vehicle shown in the video displayed in region 210. In response to the user action, the geospatial software application 180 attempts to locate a 2-dimensional extent of the object being clicked, e.g., by scanning adjacent pixels for boundaries. The geospatial software application 180 then generates an indication that identifies the selected object. For example, the application 180 draws a shape 242, such as a rectangle, around the selected object. At this time, the application 180 may also provide a label 244 for the selected object. A default label may be provided initially, such as "Object 1." The user may customize this label, e.g., by changing it to "Vehicle 1," as shown. In the depicted example, the user has also clicked on (and thereby selected) an object representing a group of people, labeling the selected object as "Adult Males."

In an example, the geospatial software application 180 mirrors selections, labels, and other computer-generated content between the first window 210 and the projected video in region 210M. Thus, for example, shape 242, label 244, and any other annotation applied to the video in region 210 is duplicated to region 210M, and vice-versa. For instance, the user initially may have selected and labeled Vehicle 1 in region 210M, rather than in region 210, in which case the shape 242 and label 244 would have been mirrored to region 210. Mirroring annotations and other synthetic content between regions 210 and 210M preferably presents content in an upright, easily-readable manner. Thus, for example, labels entered into region 210 are not rotated and deskewed when mirroring them to region 210M, as is done for video. Additional example features of the geospatial software application 180 will now be described with reference to FIG. 3.

Figure 3:
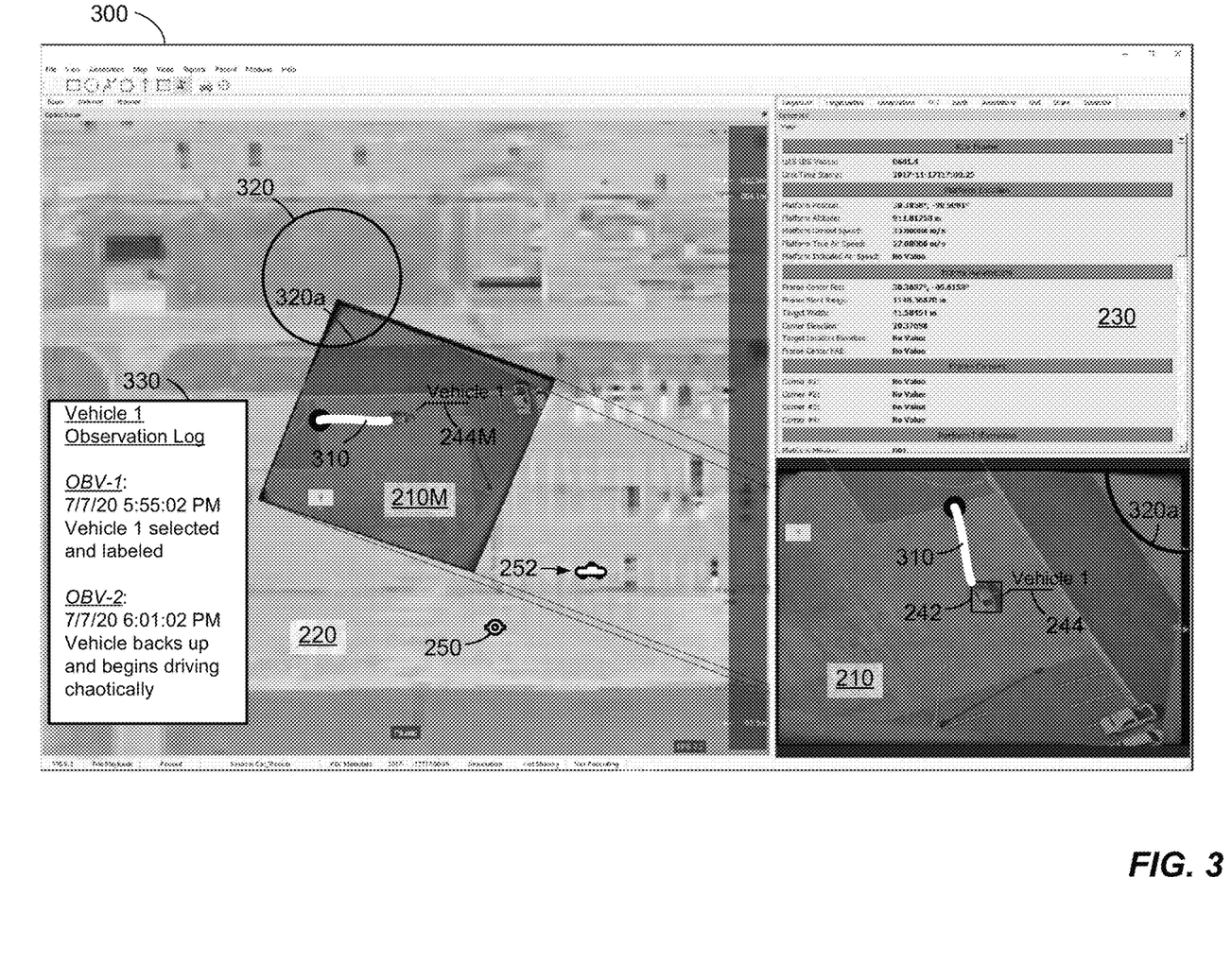
FIG. 3 is an example screenshot of the geospatial application of FIG. 2, showing additional capabilities of the geospatial application.

FIG. 3 shows an example screenshot 300 of the geospatial software application 180, which is similar to screenshot 200 but corresponds to a different time, e.g., seconds or minutes later. The Adult Males are no longer visible in the video and Vehicle 1 has moved along a path 310 to a more central position in the video. In the example shown, the geospatial software application 180 tracks movement of selected objects from frame to frame, relocating (and potentially resizing) shapes 242 to follow the objects and moving labels 244 to follow the objects. In an example, the geospatial software application 180 displays the path 310 taken by the selected object and mirrors the graphical illustration of the path 310 to the region 210M.

FIG. 3 also depicts certain advanced features. For example, the user may draw a shape, such as a circle 320, around an area of the map and specify one or more activities that occur in response to events that involve the indicated area. The activities may include, for example, generating an alert when a selected object (e.g., Vehicle 1) enters the indicated area. Many events and alerts are contemplated. These may include, for example, generating an alert when a selected object exits the indicated area, or when a selected object approaches the indicated area.

As shown, a portion 320a of the circle 320 extends into the mirrored video area 210M. As the circle 320 is synthetic content, the geospatial software application 180 mirrors the portion 320a to the first window 210, where the corresponding portion 320a may be seen.

As further shown in FIG. 3, the user may record various observations, which the geospatial software application 180 may store in a log 330. In an example, each observation is initiated by a user performing a specified selection operation, such as SHIFT-LEFT-CLICK, on a particular location on the video or map. In response to this operation, the geospatial software application 180 (i) generates a snapshot (e.g., of the clicked region or of the entire screen, (ii) marks the coordinates that the user has clicked, and (iii) accepts a timestamped textual note from the user. Log 330 contains a record of such notes. In some examples, the geospatial software application 180 also records the locations of the vertices 270 of the mirrored video. This additional action allows the snapshot of the clicked region to be placed in context on the map after the fact.

In addition to recording observations, which may be user-initiated, the geospatial software application 180 may further record information about targets, i.e., selected objects. For example, the geospatial software application 180 automatically records times and locations of selected objects, allowing paths of those objects to be observed or replayed at a later time. Some embodiments also support user annotations, such as notes that describe particular missions or observing sessions.

In an example, observations, targets, and annotations may be selectively shared in real time among different instances of the geospatial software application 180, e.g., using the above-described publisher/subscriber model. Objects originating from another instance may read-only and may be displayed differently (e.g., using different colors or shapes) than objects originating locally.

Figure 4:
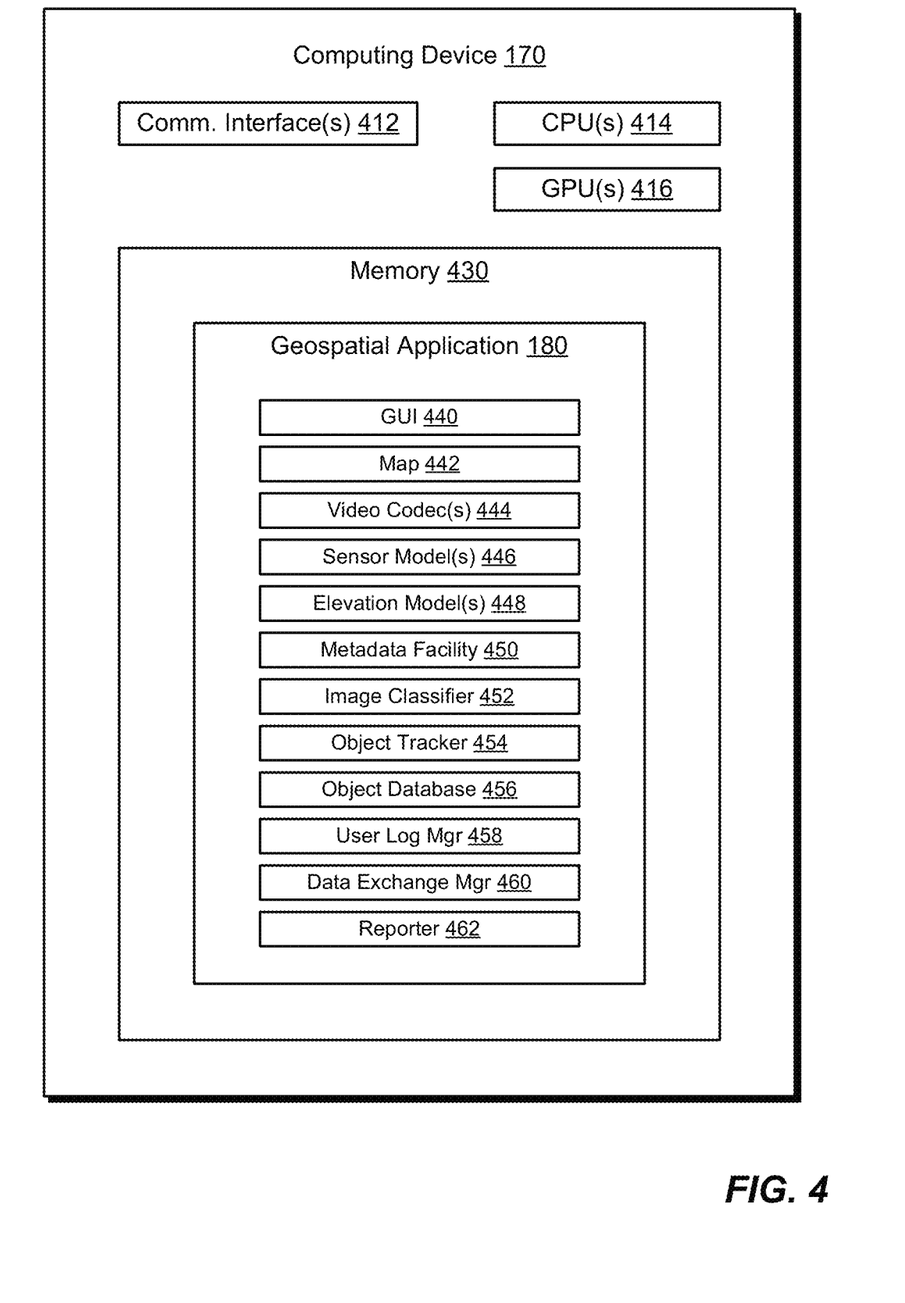
FIG. 4 is a block diagram of an example computing device that may be used in connection with certain embodiments.

FIG. 4 shows example features of the computing device 170 in additional detail. As shown, the computing device 170 includes one or more communication interfaces 412, a set of processors 414, and memory 430. The communication interfaces 412 include, for example, network interface adapters for converting electronic and/or optical signals received over a network to electronic form for use by the computing device 170. The set of processors 412 may include one or more processing chips and/or assemblies, such as numerous multi-core CPUs (central processing units). One or more GPUs (graphics processing units) 416 may also be provided. The memory 430 includes both volatile memory, e.g., RAM (Random Access Memory), and non-volatile memory, such as one or more ROMs (Read-Only Memories), disk drives, solid state drives, and the like. The set of processors 412 and the memory 430 together form control circuitry, which is constructed and arranged to carry out various methods and functions as described herein. Also, the memory 430 includes a variety of software constructs realized in the form of executable instructions and data. When the executable instructions are run by the set of processors 412, the set of processors 412 carries out the operations of the software constructs. Although certain software constructs are specifically shown and described, it is understood that the memory 430 typically includes many other software components, which are not shown, such as an operating system, various applications, processes, and daemons.

As further shown in FIG. 4, the memory 430 "includes," i.e., realizes by execution of software instructions, the above-described geospatial software application 180. In a non-limiting example, the geospatial software application 180 includes the following software components:

- GUI 440. Code for presenting a graphical user interface, such as one that is capable of rendering the screenshots of FIGS. 2 and 3.
- Video Codec(s) 444. One or more video encoders and decoders for converting digital data to video, and vice-versa.
- Sensor Model(s) 446. Model for transforming between pixels in the video (region 210) and pixels in the video projected on the map (region 210M). Preferably works bi-directionally and may be based on input from elevation model(s) 448 and metadata facility 450.
- Elevation Model(s) 448. Model for taking elevation of camera into account when acquiring video of the ground.
- Metadata facility 450. Service for collecting and storing metadata related to vehicles and/or cameras, such as the metadata displayed in region 230.
- Image Classifier 452. Optionally assists in characterizing objects automatically.

For example, may identify objects in video as automobiles, persons, airplanes, etc. May run automatically and/or in response to user operation.

- Object Tracker 454. Assists in tracking selected objects as they move between video frames. Based, for example, on matching patterns detected from earlier frames with newly-acquired frames.
- Object Database 456. A database of objects being tracked. May include, for each selected object, key-value pairs indicating coordinates and time. May acquire key-value pairs at a predetermined rate and/or in response to events, such as detecting that an identified object has moved by more than a predetermined amount.
- User Log Manager 458. Database of log entries made by user (or by each of multiple users). May include notes 330 entered for observations, corresponding metadata, and links to corresponding images.
- Data Exchange Manager 460. Manages data exchange with other instances of the geospatial software application 180, as well as with other sources of geotagged content, such as police department, fire department, and the like.
- Reporter 462. Report generator; outputs snapshots, user logs, annotations, targets, and/or events in standard format, such as Microsoft Word, Microsoft Excel, Microsoft PowerPoint, and the like.

Figure 5:
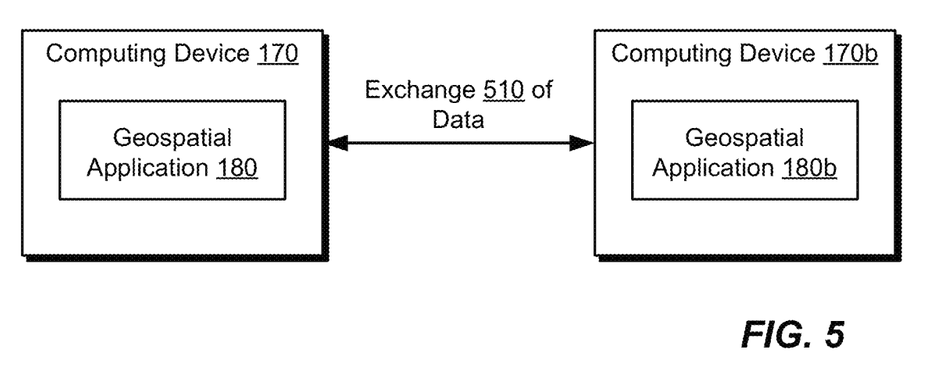
FIG. 5 is a block diagram of an example pair of computing devices engaged in data exchange for enabling collaboration between respective instances of the geospatial application.

FIG. 5 shows an example arrangement for exchanging data between different instances of the geospatial software application 180. In the example shown, a second computing device 170b is provided, which runs a second instances 180b of the geospatial software application. As indicated, the two instances 180 and 180b may exchange 510 data, so that each instance may be informed of knowledge obtained by the other. Data may be exchanged in the form of snapshots, annotations, observations, and targets. Data may be exchanged according to a publisher/subscriber model, where the user of one instance selects information to be received from another instance.

Figure 6:
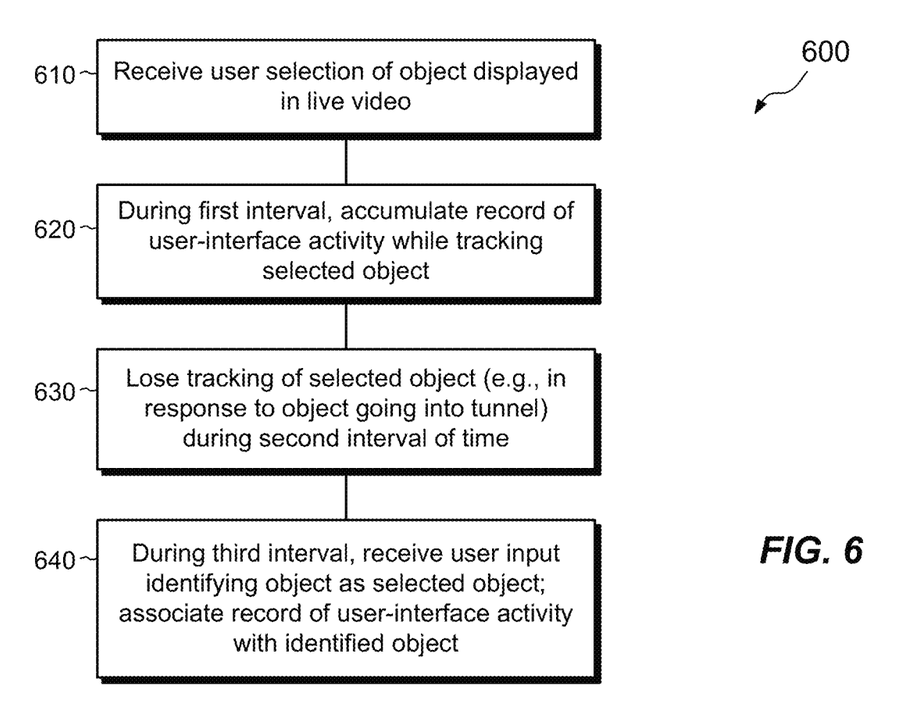
FIG. 6 is a flowchart showing an example method of reassociating previously-acquired user-interface activity associated with a selected object after that object has disappeared from view and later reappears.
Figure 7:
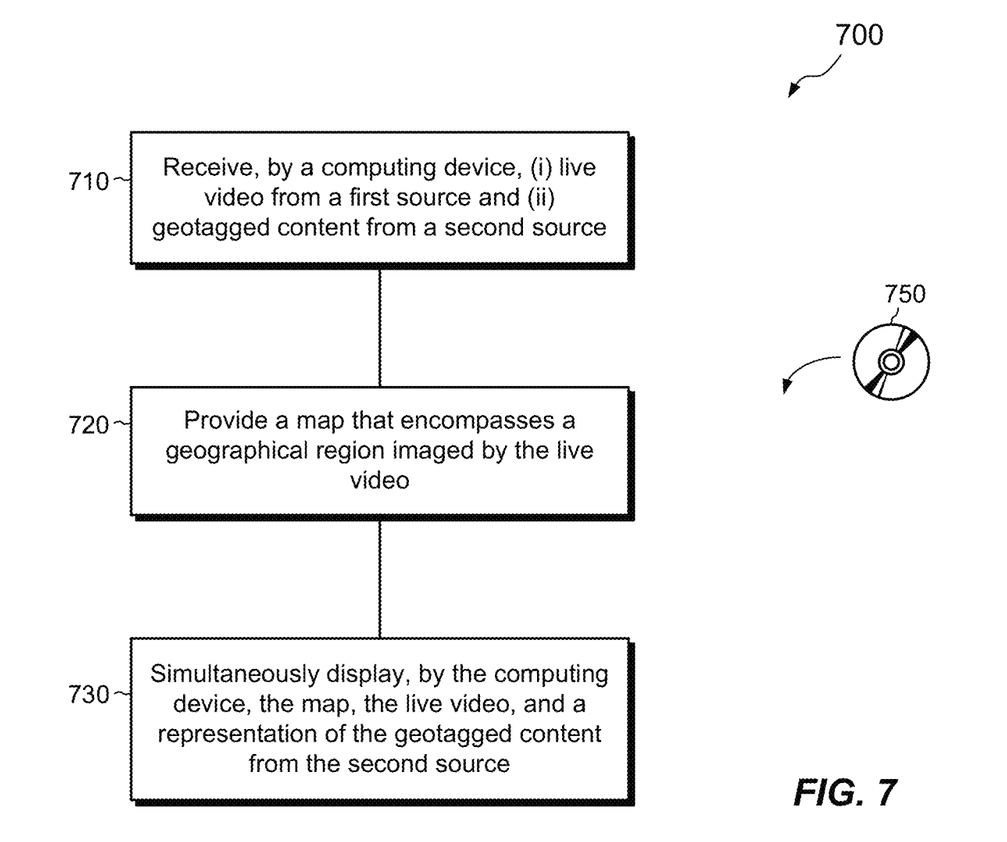
FIG. 7 is a flowchart showing an example method of performing collaborative geospatial tracking.

FIGS. 6 and 7 show example methods 600 and 700 that may be carried out in connection with the embodiments described above. The methods 600 and 700 may be performed by the computing device 170, e.g., via the software constructs shown in FIG. 4. The depicted acts may be performed in any suitable order, which may include performing certain acts simultaneously.

FIG. 6 shows an example method 600 of associating a record of user-interface activity collected for an earlier-appearing object with a later-appearing object.

At 610, the geospatial software application 180 receives a user selection of an object displayed in live video. For example, the geospatial software application 180 may detect that the user has selected a vehicle (e.g., Vehicle 1) displayed in the video, e.g., by the user clicking on the vehicle displayed in region 210 of FIG. 2.

At 620, the geospatial software application 180 accumulates a record of user-interface activity while tracking the selected object. The geospatial software application 180 may also acquire key-value pairs (e.g., time and location) associated with tracking the selected object.

At 630, the selected object may disappear from sight. For example, Vehicle 1 may enter a tunnel or indoor parking garage.

Sometime later, at 640, the selected object may reappear, e.g., by coming out of the tunnel or parking garage. The geospatial software application 180 does not automatically recognize the object as the previously-tracked Vehicle 1, however. Rather, the geospatial software application 180 may receive a user action that associates the object with the previously-tracked object. Doing so has the effect of associating all of the user-interface activity previously associated with Vehicle 1 with the new object, which then assumes the identity of Vehicle 1. In this manner, the history if interaction with Vehicle 1 is maintained, despite the intervening loss of contact.

FIG. 7 shows an example method 700 for collaborative geospatial tracking and provides an overview of some of the features described above.

At 710, computing device 170 receives (i) live video from a first source and (ii) geotagged content from a second source. For example, the geospatial software application 180 receives live video from a camera on a vehicle 110, 120, or 130. The geotagged content may include a representation of a fire hydrant, a police car, or the like and may be received from a fire department, police department, or the like.

At 720, a map is provided that encompasses a geographical region imaged by the live video. For example, the geospatial software application 180 may access a map that includes the area being imaged by a camera of the vehicle.

At 730, the computing device simultaneously displays the map, the live video, and a representation of the geotagged content from the second source. For example, the live video is displayed in region 210 and/or 210M, and the geotagged content is displayed as symbols 250 and 250 on the map in region 220.

An improved technique has been described for geospatial tracking. The technique includes receiving live video from a first source, rendering a map that encompasses a geographical region imaged by the live video, and displaying the map along with the live video, thereby enabling a human user or computer to associate objects in the video with geographical features on the map. The technique further includes receiving geotagged content from a second source and displaying a representation of the geotagged content along with the video and the map.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like, shown by way of example as medium 750 of FIG. 7. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the instant disclosure.

What is claimed is:

1. A method of performing collaborative geospatial tracking, comprising:
    receiving, by a computing device, (i) live video from a first source and (ii) geotagged content from a second source;
    providing a map that encompasses a geographical region imaged by the live video; and
    simultaneously displaying, by a software application of the computing device, the map, the live video, and a representation of the geotagged content from the second source,
    wherein simultaneously displaying includes projecting a modified version of the live video onto the map, such that the computing device displays dynamic content of the live video overlaying static content of the map, and
    wherein the method further comprises generating the modified version of the live video at least in part by:
        removing a perspective effect in the live video, including aligning vertices of the live video with corresponding geographical points on the map; and
        transforming the live video to fit within the geographical points on the map.

2. The method of claim 1, wherein displaying the representation of the geotagged content includes rendering a symbol that represents the geotagged content and placing the symbol on the map at a location based on geographical coordinates of the geotagged content.

3. The method of claim 2, further comprising:
    receiving additional geotagged content from a third source; and
    displaying the additional geotagged content source as a second symbol on the map, the second symbol having a different appearance than the symbol.

4. The method of claim 3, wherein the second source and the third source are disposed at respective different locations.

5. The method of claim 1, wherein simultaneously displaying includes rendering the map in a first display region of the computing device and rendering the live video in a second display region of the computing device.

6. The method of claim 1, further comprising:
    in response to a user or machine action that selects an object shown in the live video, (i) drawing an indication that identifies the selected object; and (ii) tracking the selected object on successive frames of the live video such that the indication continues to follow the selected object as the selected object moves.

7. The method of claim 6, further comprising:
    receiving input that specifies a geographical area on the map; and
    generating an alert in response to the selected object entering the specified geographical area.

8. The method of claim 6, further comprising:
    receiving a label that identifies the selected object; and
    displaying the label adjacent to the indication that identifies the selected object, such that the label follows the selected object as the selected object moves.

9. The method of claim 6, further comprising receiving notes pertaining to the selected object and storing the notes in association with the selected object.

10. The method of claim 6, further comprising:
    recording user-interface activity that occurs while the selected object is being displayed; and
    storing a record of the user-interface activity in connection with the selected object.

11. The method of claim 10, wherein the user-interface activity includes at least one of (i) clicks on the selected object; (ii) notes entered in connection with the selected object, or (iii) snapshots taken of the map and/or live video when the selected object is being displayed.

12. The method of claim 11, further comprising generating a tracking report for the selected object, the tracking report including the record of the user-interface activity in connection with the selected object.

13. The method of claim 10, further comprising:
the computing device running a first instance of a software application; and
sharing, by the first instance of the software application, the record of the user-interface activity in connection with the selected object with a second instance of the software application, thereby enabling the second instance of the software application to track the selected object.

14. The method of claim 10, further comprising:
the computing device running a first instance of a software application;
receiving a second record of user-interface activity obtained by a second instance of the software application, the second record of user-interface activity pertaining to a second selected object being tracked by the second instance of the software application; and
displaying a representation of the second selected object on the map by the first instance of the software application.

15. The method of claim 6, further comprising:
storing a record of user-interface activity accumulated while tracking the selected object during a first interval of time;
ceasing to track the selected object, responsive to the selected object not being displayed in the live video during a second interval of time after the first interval of time; and
during a third interval of time after the second interval of time, (i) identifying an object appearing in the live video as the selected object and (ii) associating the record of user-interface activity accumulated during the first interval of time with the identified object.

16. The method of claim 1 wherein, when simultaneously displaying the map, the live video, and the representation of the geotagged content from the second source, the live video provides images of the ground within a geographical region displayed by the map.

17. The method of claim 1, wherein the act of simultaneously displaying includes projecting a modified version of the live video onto a portion of the map, such that the computing device displays dynamic content of the live video along with static content of the map, the modified version displayed with a same geographical orientation as the map such that features shown in the modified version blend with surrounding features shown in the map.

18. A computing device, comprising control circuitry that includes a set of processors coupled to memory, the control circuitry constructed and arranged to:

receive (i) live video from a first source and (ii) geotagged content from a second source;
provide a map that encompasses a geographical region imaged by the live video; and
simultaneously display, by a software application of the computing device, the map, the live video, and a representation of the geotagged content from the second source,
wherein the control circuitry constructed and arranged to simultaneously display is further constructed and arranged to project a modified version of the live video onto the map, such that the computing device displays dynamic content of the live video overlaying static content of the map, and
wherein the control circuitry is further constructed and arranged to generate the modified version of the live video at least in part by:
removing a perspective effect in the live video, including aligning vertices of the live video with corresponding geographical points on the map; and
transforming the live video to fit within the geographical points on the map.

19. A computer program product including a set of non-transitory, computer-readable media having instructions which, when executed by control circuitry of a computing device, cause the computing device to perform a method collaborative geospatial tracking, the method comprising:
receiving, by a computing device, (i) live video from a first source and (ii) geotagged content from a second source;
providing a map that encompasses a geographical region imaged by the live video; and
simultaneously displaying, by a software application of the computing device, the map, the live video, and a representation of the geotagged content from the second source,
wherein simultaneously displaying includes projecting a modified version of the live video onto the map, such that the computing device displays dynamic content of the live video overlaying static content of the map, and
wherein the method further comprises generating the modified version of the live video at least in part by:
removing a perspective effect in the live video, including aligning vertices of the live video with corresponding geographical points on the map; and
transforming the live video to fit within the geographical points on the map.

\* \* \* \* \*